United States Patent
Goehlich et al.

(10) Patent No.: US 9,561,617 B2
(45) Date of Patent: Feb. 7, 2017

(54) DEVICES FOR BONDING PARTS TO BE JOINED

(71) Applicant: AIRBUS OPERATIONS GMBH, Hamburg (DE)

(72) Inventors: Robert Alexander Goehlich, Hamburg (DE); Malte Sander, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/094,338

(22) Filed: Apr. 8, 2016

(65) Prior Publication Data

US 2016/0221249 A1   Aug. 4, 2016

Related U.S. Application Data

(62) Division of application No. 13/534,110, filed on Jun. 27, 2012, now Pat. No. 9,333,703.

(Continued)

(30) Foreign Application Priority Data

Jun. 27, 2011   (DE) .................. 10 2011 078 144

(51) Int. Cl.
  *B29C 65/00*   (2006.01)
  *B29C 65/06*   (2006.01)
  (Continued)

(52) U.S. Cl.
  CPC ......... *B29C 65/0681* (2013.01); *B23K 20/128* (2013.01); *B23K 20/1255* (2013.01); *B29C 65/488* (2013.01); *B29C 65/4815* (2013.01); *B29C 65/72* (2013.01); *B29C 66/0242* (2013.01); *B29C 66/1142* (2013.01); *B29C 66/30341* (2013.01); *B29C 66/43* (2013.01); *B29C 66/721* (2013.01); *B29C 66/72143* (2013.01); *B29C 66/73921* (2013.01); *B29C 66/836* (2013.01); *B23K 20/122* (2013.01);
  (Continued)

(58) Field of Classification Search
  CPC .... B29C 65/028; B29C 65/06; B29C 65/0672; B29C 65/068; B23K 20/122
  USPC .................. 156/304.1, 73.5, 583.1
  See application file for complete search history.

(56) References Cited

U.S. PATENT DOCUMENTS 6,543,671 B2 *  4/2003  Hatten ................. B23K 20/128
                                                   228/112.1
7,163,138 B1   1/2007  Dudt et al.
(Continued)

FOREIGN PATENT DOCUMENTS

DE   10 2008 019 062 A1   10/2009
EP   1738857 A1   1/2007
(Continued)

OTHER PUBLICATIONS

European Search Report for EP 12 17 3577 dated Sep. 27, 2012.
European Office Action for EP 12173 577.3 dated Mar. 20, 2015.

*Primary Examiner* — Mark A Osele
*Assistant Examiner* — Nickolas Harm
(74) *Attorney, Agent, or Firm* — Carter, DeLuca, Farrell & Schmidt, LLP

(57) ABSTRACT

A device is provided for producing a bonded joint between fiber-reinforced thermoplastic parts to be joined, in which fiber-containing plastic material is mixed into the joining zone while friction stir welding the parts to be joined in the form of a butt joint.

4 Claims, 2 Drawing Sheets

Related U.S. Application Data

(60) Provisional application No. 61/501,275, filed on Jun. 27, 2011.

(51) Int. Cl.

| | | |
|---|---|---|
| *B29C 65/48* | (2006.01) | |
| *B29C 65/72* | (2006.01) | |
| *B29C 65/02* | (2006.01) | |
| *B29C 65/08* | (2006.01) | |
| *B23K 20/12* | (2006.01) | |
| *B29C 35/02* | (2006.01) | |
| *B29L 31/30* | (2006.01) | |
| *B29K 101/12* | (2006.01) | |
| *B29K 105/08* | (2006.01) | |
| *B29K 105/00* | (2006.01) | |

(52) U.S. Cl.
CPC ...... *B23K 2201/08* (2013.01); *B23K 2201/18* (2013.01); *B23K 2203/16* (2013.01); *B29C 35/02* (2013.01); *B29C 65/028* (2013.01); *B29C 65/06* (2013.01); *B29C 65/0672* (2013.01); *B29C 65/086* (2013.01); *B29C 66/0382* (2013.01); *B29C 66/7212* (2013.01); *B29C 66/72141* (2013.01); *B29C 66/7394* (2013.01); *B29C 66/9261* (2013.01); *B29K 2101/12* (2013.01); *B29K 2105/08* (2013.01); *B29K 2105/256* (2013.01); *B29L 2031/3082* (2013.01); *Y10T 428/24479* (2015.01)

(56) References Cited

U.S. PATENT DOCUMENTS

| | | |
|---|---|---|
| 2003/0042292 A1 | 3/2003 | Hatten et al. |
| 2003/0201307 A1* | 10/2003 | Waldron ............. B23K 20/122 228/112.1 |
| 2003/0205565 A1 | 11/2003 | Nelson et al. |
| 2007/0044406 A1 | 3/2007 | Van Aken et al. |
| 2008/0237305 A1 | 10/2008 | Rennick et al. |
| 2008/0292849 A1 | 11/2008 | Stephan |
| 2008/0296350 A1 | 12/2008 | Henneboehle et al. |
| 2009/0014497 A1* | 1/2009 | Ryu ................... B23K 20/122 228/2.3 |
| 2009/0087681 A1* | 4/2009 | Decker ................ F41H 5/0442 428/649 |
| 2009/0098369 A1 | 4/2009 | Manicke et al. |
| 2011/0131784 A1 | 6/2011 | de Traglia Amancio Filho et al. |
| 2011/0248070 A1* | 10/2011 | Furfari ............... B23K 20/123 228/112.1 |
| 2013/0048786 A1 | 2/2013 | Bezaire et al. |

FOREIGN PATENT DOCUMENTS

| | | |
|---|---|---|
| EP | 1941987 A1 | 7/2008 |
| JP | 2003145625 A | 5/2003 |
| WO | 9310935 A1 | 6/1993 |

* cited by examiner

DEVICES FOR BONDING PARTS TO BE JOINED

CROSS REFERENCE TO RELATED APPLICATIONS

This application is a divisional of U.S. patent application Ser. No. 13/534,110, filed on Jun. 27, 2012, which claims priority to U.S. provisional application No. 61/501,275 filed on Jun. 27, 2011 and to German application number 10 2011 078 144.7 filed on Jun. 27, 2011.

TECHNICAL FIELD

The invention pertains to a method for producing a bonded joint between fiber-reinforced thermoplastic parts to be joined, a device for carrying out such a method and a component manufactured in accordance with such a method.

BACKGROUND OF RELATED ART

Civil aircraft are traditionally manufactured in the form of metal constructions. In recent times, however, aircraft parts or parts to be joined such as fuselage shells, circumferential reinforcements, longitudinal reinforcements, crossbeams, wing and tail unit shells and the like are increasingly manufactured of fiber-reinforced plastics. These plastics contain, for example, carbon fibers, aramid fibers or glass fibers that are arranged in a plurality of layers and embedded in an epoxy resin matrix. However, epoxy resins are thermosetting plastics and therefore not fusible after curing such that the plastic-based parts are joined with joining methods known from metal constructions such as riveting or bonding. Due to rivet bores, however, riveting methods are associated with a structural weakening that can be intensified by torn fibers, delaminations and the like. In addition, riveting methods are very time-consuming due to the plurality of individual steps to be carried out manually such as aligning the parts to be joined relative to one another, producing the rivet bores, cleaning the rivet bores, tacking and setting the rivets. In addition, a bearing stress can be observed during the riveting process. Furthermore, quasi-isotropic properties of the parts to be joined are not utilized during the riveting process, but rather annihilated in certain areas. Bonding methods, in contrast, require a very high degree of cleanliness and elaborate cleaning measures for preparing the adherends. The adhesives also require a certain curing time such that bonding methods are also time-consuming. Furthermore, strict regulations for preventing the personnel from being subjected to health hazards needs to be observed in bonding methods. In addition, it is not possible to carry out a non-destructive examination of the bond. Riveting methods and known bonding methods also require a material overlap such that the finished component is not optimized with respect to its weight on the one hand and a steplike load flow is created on the other hand.

Alternatively to a thermosetting plastic matrix, the fibers may also be embedded in a thermoplastic matrix. Thermoplastics merely solidify and therefore can be plasticized or fused when a certain melting temperature is exceeded. Due to the extensive experience in the field of riveting and bonding methods, however, such parts to be joined are also routinely riveted or bonded in the construction of aircraft.

SUMMARY

It is the objective of the invention to develop a method for producing a bonded joint between fiber-reinforced thermoplastic parts to be joined that eliminates the above-described disadvantages and allows short cycle times. The invention furthermore aims to develop a device for carrying out such a method, as well as a joined component with optimized weight and high joining seam strength.

In an inventive method for producing a bonded joint between fiber-reinforced thermoplastic parts to be joined, the parts to be joined are positioned in the form of a butt joint in order to define a course of a joining seam and welded to one another by means of friction stir welding, wherein fiber-containing plastic material is mixed into a joining zone.

Friction stir welding makes it possible to realize short cycle times because elaborate preparatory or follow-up measures such as drilling and cleaning are eliminated after the alignment of the parts to be joined relative to one another. In this case, the friction stir welding can be conveniently automated such that a high reproducible joining seam quality and process quality is ensured in addition to short cycle times. Due to the elimination of rivet bores, friction stir welding furthermore is not associated with structural weakening as it is the case with riveting methods. Elaborate cleaning of adherends is also eliminated. The butt joint does not result in an overlap between the parts to be joined such that a load flow without steps can adjust over the joining seam between the parts to be joined. Furthermore, an elaborate tolerance compensation of the parts to be joined by means of spacers, shims and the like is not required. Consequently, no tensions caused by deformations or distortions of the parts to be joined are introduced into the joining seam. The supplied fiber-containing plastic material causes a thickening of the joining zone such that the parts to be joined are bonded to one another over a larger seam cross section and the seam strength is correspondingly increased, wherein embrittlement of the joining seam is prevented by the fibers such that the joining seam and therefore the joined component have, in principle, the same strength as the parts to be joined.

The introduction of the plastic material can be realized in a simple fashion with respect to the device technology if it is superficially supplied to the joining zone.

In order to achieve a reliable distribution of the plastic material over the entire joining zone cross section, the plastic material can also be rubbed into the joining zone by a friction shoulder. For this purpose, the friction shoulder may carry out a lifting motion, wherein the plastic material is supplied when the friction shoulder is spaced apart from the joining zone, i.e., when a gap is present between the friction shoulder and the joining zone.

In an alternative exemplary embodiment, the plastic material is supplied to the joining zone on the face in the region of a stirring pin that rotates and penetrates between the parts to be joined such that the plastic material can be purposefully introduced into the joining zone centrally.

In an alternative exemplary embodiment, the plastic material is injected between the parts to be joined in order to prevent a non-uniform distribution of the plastic material over the joining zone cross section.

Due to the low thermal conductivity of plastics and a self-lubrication at elevated temperatures, a low maximum temperature adjusts between the parts to be joined and the friction shoulder during friction stir welding. In order to reliably achieve a complete heat penetration of the joining zone, the joining zone may be pre-heated to a temperature that at least lies close to a melting temperature of the parts to be joined.

The plastic material may also be heated above its melting temperature such that additional heat can be supplied to the joining zone. Heat can be centrally supplied into the joining zone at a distance from the surface by means of the plastic material, particularly if the plastic material is injected between the parts to be joined. In this case, a contact pressure of the friction shoulder can possibly be reduced.

An inventive device for carrying out an inventive method has a welding tool that features a rotating friction shoulder for heating parts to be joined in a joining zone, a rotating stirring pin for intermixing plasticized material and a feed device for supplying fiber-containing plastic material.

In order to supply the plastic material in the region of the stirring pin, the feed device may feature an inner channel that is integrated into the welding tool and leads out of the friction shoulder on the face thereof.

In order to directly supply the plastic material between the parts to be joined, the inner channel may radially lead out of the stirring pin.

The device may feature a heat source such as a heat lamp in order to pre-heat the joining zone.

An inventive component is manufactured in accordance with an inventive method and therefore characterized by a high-strength and high-quality joining seam, a high structural stability, a load-optimized and weight-optimized lightweight construction and a load flow without steps over the region of the seam.

Other advantageous exemplary embodiments of the invention form the objects of additional dependent claims.

BRIEF DESCRIPTION OF THE DRAWINGS

Preferred exemplary embodiments of the invention are described in greater detail below with reference to highly simplified schematic drawings. In these drawings.

DETAILED DESCRIPTION

Figure 1:
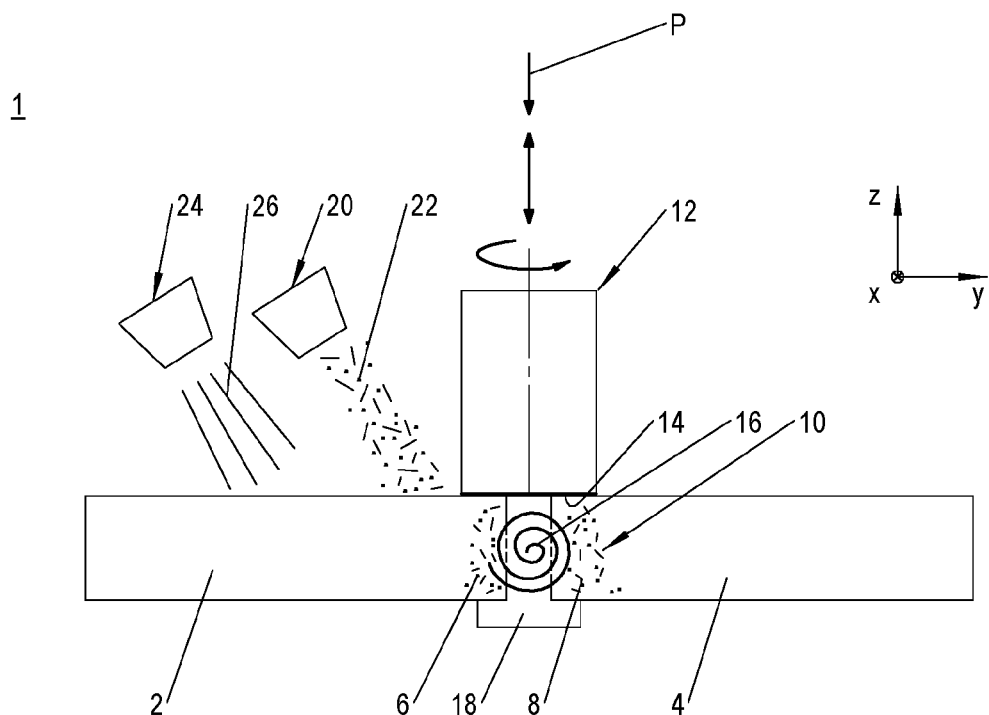
FIG. 1 shows a first exemplary embodiment of an inventive device and an inventive method for producing a bonded joint between two parts to be joined.

FIG. 1 shows a first device 1 and a first method for bonding two parts to be joined 2, 4 into a component.

The parts to be joined 2, 4 are positioned in the form of a butt joint and form a joining zone 10 with their opposing and contacting body sections 6, 8. For example, the parts to be joined 2, 4 form skin panels for aircraft fuselages that need to be joined to one another. The parts to be joined 2, 4 consist of fiber-reinforced laminates with a plurality of fiber structures such as non crimp fiber fabrics, woven fiber fabrics, prepregs and the like that are arranged in a layered fashion and embedded in a thermoplastic matrix. The fibers of the fiber structures consist of carbon fibers, glass fibers, aramid fibers and the like that are realized in the form of long fibers.

Figure 2:
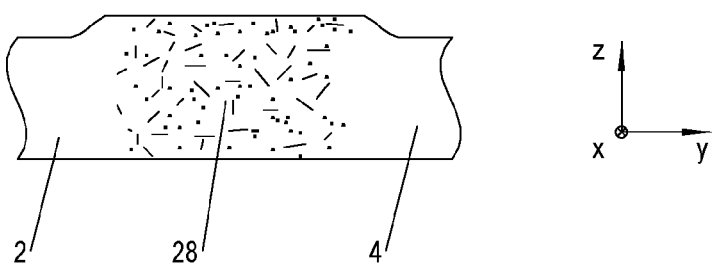
FIG. 2 shows a lifting motion of a friction shoulder illustrated in FIG. 1.

The device 1 has a friction stir tool 12 with a friction shoulder 14 and with a stirring pin 16. The friction shoulder 14 and the stirring pin 16 are able to rotate in the same direction about a vertical tool axis z. However, their rotational speeds may vary such that the number of revolutions of the friction shoulder 14 differs from the number of revolutions of the stirring pin 16. The friction shoulder 14 and the stirring pin 16 have a smooth face or circumferential surface that, however, could also be realized rough with elevations and depressions. For example, the stirring pin 16 is realized in a thread-like fashion in order to improve the stirring effect and the intermixing of the plasticized body sections 6, 8. In addition, the friction stir tool 12 and, in particular, the friction shoulder 14 can be displaced along the vertical tool axis z such that the friction shoulder 14 can be spaced apart from the joining zone 10 and carry out a lifting motion that is schematically illustrated in FIG. 2 during the displacement in the longitudinal direction x of the joining zone 10. The stirring pin 16 has a length that corresponds to the thickness or dimension of the body sections 6, 8 along the vertical tool axis z.

In order to support the parts to be joined 2, 4 on their side that faces away from the friction shoulder 14, the friction stir tool 12 is in this exemplary embodiment realized in the form of a so-called Bobbin-Tool with a rotating counter bracket 18 that forms a plate-like head section of the stirring pin 16. Alternatively, the parts to be joined 2, 4 may be positioned on a corresponding support.

The device 1 also has a feed device 20 for supplying fiber-containing plastic material 22. The feed device 22 allows a continuous and steady supply of the fused plastic material 22. In order to increase the temperature within the joining zone 10, the feed device 20 may cooperate with a not-shown heater for heating the plastic material 22 above its melting temperature.

The plastic material 22 consists of a liquid or free-flowing thermosetting plastic matrix or thermoplastic matrix with a plurality of shred-like carbon fibers, glass fibers or aramid fibers embedded therein. In order to achieve a strength comparable to that of long fibers, the fibers may have a roughened surface or respectively feature interlocking serrations or barbs.

The device 1 also features a heat source 24 for pre-heating the joining zone 10 to a temperature slightly below a melting temperature of the thermoplastic matrix by means of thermal radiation 26.

Figure 3:
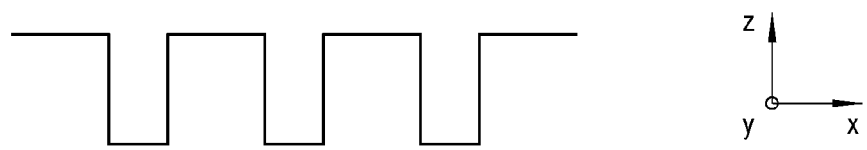
FIG. 3 shows an inventive joining seam.

In an inventive method, the parts to be joined 2, 4 are welded to one another in the form of a butt joint by means of friction stir welding, wherein the fiber-containing plastic material 22 is mixed into the joining zone 10 as indicated with the spiral line in FIG. 1. This results in the formation of a joining seam 28 that is illustrated in FIG. 3 and characterized by a high seam strength, as well as a slight thickening in the region of the friction shoulder 14 due to the additional plastic material 22. The fiber-containing plastic material causes a continuation of the structural properties and material properties of the parts to be joined 2, 4 beyond the joining seam 28 such that the joined component shows no or almost no structural or material weakening in the region of the joining seam 28.

The parts to be joined 2, 4 are arranged in the form of a butt joint and the joining zone 10 is pre-heated to a temperature that lies at least close to the melting temperature of the thermoplastic matrix of the parts to be joined 2, 4 by means of the heat source 24. The friction stir tool 12 is activated and the friction shoulder 14 and the stirring pin 16 are set in rotation. The stirring pin 16 is inserted into the joining zone 10 between the parts to be joined 2, 4 and the friction shoulder 14 is pressed against the body sections 6, 8 in the direction of the longitudinal tool axis z with a pressure P. The friction of the friction shoulder 14 on the body sections 6, 8 creates frictional heat that is introduced into the joining zone 10 and causes the body sections 6, 8 to plasticize in combination with the radiant heat of the heat source 24 and the material heat of the plastic material 22, wherein these plasticized body sections are then intermixed by means of the stirring pin 16. The friction stir tool 12 is moved in the longitudinal direction x of the joining zone 10 and the joining seam 10 is hereby formed.

According to the invention, the fiber-containing plastic material 22 is supplied into the joining zone 10, wherein the plastic material 22 is superficially supplied to the joining zone 6 underneath the friction shoulder 14 referred to the direction of the vertical tool axis z in order to reliably mix the plastic material 22. For this purpose, at least the friction shoulder 14 carries out a lifting motion along the longitudinal tool axis z such that the friction shoulder 14 is intermittently spaced apart from the joining zone 10 and the plastic material 22 can be superficially supplied to the joining zone 10 underneath the friction shoulder 14. When the friction shoulder 14 is lowered, the superficial plastic material 22 is rubbed into the joining zone 10, as well as mixed with the plasticized body sections 6, 8 by means of the stirring pin 16 and therefore uniformly distributed over the entire joining zone cross section and consequently over the entire joining seam cross section. A discontinuous supply of the plastic material 22 takes place because the plastic material 22 is always supplied when the friction shoulder 14 is spaced apart from the joining zone 10.

After the displacement of the welding tool, the previously formed section of the joining zone 10 cools off. When using a thermoplastic material 22, the joining zone 10 solidifies and a subsequent treatment such as a heat-pressure treatment is not required. When using a thermosetting plastic material 22, a subsequent heat-pressure treatment is carried out, e.g., in an autoclave in order to cure the joining zone 10.

Figure 4:
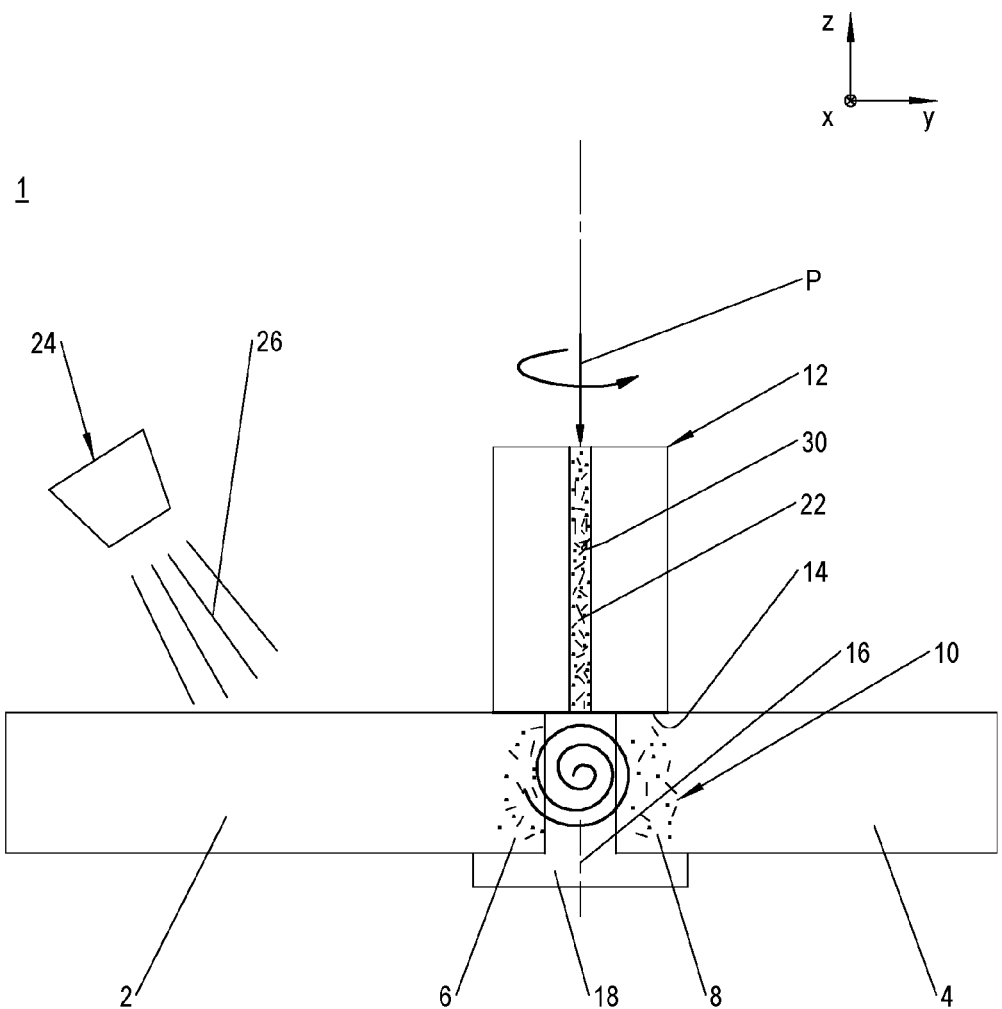
FIG. 4 shows a second exemplary embodiment of an inventive device and an inventive method for producing a bonded joint between two parts to be joined.

In an alternative variation of the device and the method that is schematically illustrated in FIG. 4, fiber-containing plastic material 22 is continuously supplied during the motion of a welding tool 12 in the longitudinal direction x of the joining zone 10. A lifting motion of the friction shoulder 14 is not required. In this exemplary embodiment, the rotating welding tool 12 or the rotating friction shoulder 14 therefore is continuously guided over the joining zone 10 in the longitudinal direction x and exerts a pressure P during this process, wherein the plastic material 22 is mixed with the plasticized material 6, 8 by means of the stirring pin 16. For this purpose, the welding tool 12 features a supply channel of a not-shown feed device 20 that is realized in the form of an inner channel 30 and leads out of the friction shoulder 14 on the face thereof, wherein the fiber-containing plastic material 22 is supplied to the joining zone 6 through this feed channel. The inner channel 30 leading out of the friction shoulder 14 extends coaxial to the vertical tool axis z and annularly encompasses the stirring pin 16 in the outlet region.

In a variation of the device that can be easily manufactured, the inner channel 30 is realized in the form of a through-bore that extends parallel to the stirring pin 16 and has a circular cross section. The inner channel 28 may also have a lunulate cross section, an arcuate cross section and the like that partially encompasses the stirring pin 16.

The inner channel 30 may alternatively or additionally extend into the stirring pin 16 and laterally lead out of this stirring pin in the form of at least one radial opening such that the plastic material 22 is not supplied to the joining zone 10 superficially, but rather between the parts to be joined 2, 4.

Disclosed is a method for producing a bonded joint between fiber-reinforced thermoplastic parts to be joined, in which fiber-containing plastic material is mixed into the joining zone while friction stir welding the parts to be joined in the form of a butt joint, as well as a device for carrying out such a method and a thusly joined component.

The invention claimed is:
1. A device, comprising:
a welding tool including a rotatable friction shoulder configured to heat parts to be joined in a joining zone;
a rotatable stirring pin configured to intermix plasticized material, the rotatable stirring pin including a rotatable counter bracket forming a plate-like head section of the rotatable stirring pin, and the rotatable counter bracket configured to support the parts to be joined each on a side facing away from the rotatable friction shoulder; and
a feed device configured to supply fiber-containing plastic material into the joining zone,
wherein the rotatable friction shoulder is further configured to:
heat the fiber-containing plastic material above its melting temperature,
rub the fiber-containing plastic material into the joining zone,
be intermittently lifted relative to the joining zone to superficially discontinuously supply the fiber-containing plastic material to the joining zone between the friction shoulder and the parts to be joined, and
when approaching the joining zone, mix the fiber-containing plastic material with the parts to be joined.
2. The device of claim 1, wherein the feed device includes an inner channel integrated into the welding tool and leading out of the rotatable friction shoulder on a face thereof.
3. The device of claim 1, wherein the feed device includes an inner channel integrated into the welding tool and radially extending from the rotatable stirring pin.
4. The device of claim 1, further comprising a heat source configured to pre-heat the joining zone.

* * * * *